United States Patent
Teslak et al.

(10) Patent No.: US 7,082,757 B2
(45) Date of Patent: Aug. 1, 2006

(54) PUMP/MOTOR OPERATING MODE SWITCHING CONTROL FOR HYDRAULIC HYBRID VEHICLE

(75) Inventors: Chris Teslak, Plymouth, MI (US); Ron Kepner, Ann Arbor, MI (US); Peter Chalk, Storridge (GB); Chuanchi Tang, Troy, MI (US); Cliff Carlson, Fenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 211 days.

(21) Appl. No.: 10/883,311

(22) Filed: Jul. 1, 2004

(65) Prior Publication Data

US 2006/0000208 A1    Jan. 5, 2006

(51) Int. Cl.
*F04B 31/00* (2006.01)

(52) U.S. Cl. .......................... 60/414; 180/165

(58) Field of Classification Search ................ 60/414, 60/416; 180/165, 307
See application file for complete search history.

(56) References Cited

U.S. PATENT DOCUMENTS

| | | | |
|---|---|---|---|
| 3,892,283 A | 7/1975 | Johnson | |
| 4,098,144 A * | 7/1978 | Besel et al. | 180/165 |
| 4,246,978 A | 1/1981 | Schulz et al. | |
| 4,760,697 A * | 8/1988 | Heggie et al. | 180/165 |
| 4,813,510 A * | 3/1989 | Lexen | 60/414 |
| 5,042,251 A | 8/1991 | Berthold | |
| 5,495,912 A | 3/1996 | Gray, Jr. et al. | |
| 5,505,527 A | 4/1996 | Gray, Jr. et al. | |
| 5,799,562 A | 9/1998 | Weinberg | |
| 6,719,080 B1 * | 4/2004 | Gray, Jr. | 60/414 |
| 6,971,232 B1 * | 12/2005 | Singh | 60/414 |

OTHER PUBLICATIONS

SAE Technical Paper Series 2002-01-3128, R.P. Kepner, Ford Motor Company, Hydraulic Power Assist—A Demonstration of Hydraulic Hybrid Vehicle Regenerative Braking in a Road Vehicle Application, Nov. 18-20, 2002, pp. 1-8.

* cited by examiner

*Primary Examiner*—Thomas E. Lazo
(74) *Attorney, Agent, or Firm*—David B. Kelley; MacMillan, Sobanski & Todd

(57) ABSTRACT

A system for transmitting power hydraulically to and from the wheels of a motor vehicle includes an accumulator containing fluid at relatively high pressure, a reservoir containing fluid at lower pressure, and a pump/motor driveably connected to the wheels and having a variable volumetric displacement for pumping fluid between the accumulator and the reservoir. A first circuit connects the inlet to the reservoir and the outlet to the accumulator. A second circuit includes a first path having a low flow rate capacity, a second path having a higher flow rate capacity. A controller switches between pumping operation and motoring operation, opens and closes the first path during motoring operation, and reduces the displacement before switching between pumping operation and motoring operation.

14 Claims, 5 Drawing Sheets

US 7,082,757 B2

PUMP/MOTOR OPERATING MODE SWITCHING CONTROL FOR HYDRAULIC HYBRID VEHICLE

BACKGROUND OF THE INVENTION

The invention relates to a hybrid vehicle powertrain having an engine and a hydraulic drive. More particularly, the invention pertains to switching a pump/motor between pumping operation and motoring operation.

Hydraulic Power Assist (HPA) is a type of hydraulic hybrid vehicle, in which energy from regenerative braking or from an engine is stored in a hydro-pneumatic accumulator, and the conversion between mechanical power and hydraulic power is achieved through high pressure pump/motor having a variable volumetric displacement. In an HPA system, using stored energy from regenerative braking to help accelerate the vehicle reduces the burden on the engine and reduces fuel use.

Because of the high power density available with such hydraulic systems, it is possible to recover efficiently a significant portion of braking energy with an HPA system comprised of a single pump/motor and storage accumulators. With a 7000 lb. vehicle and a pump/motor whose maximum displacement is 150 cc., an HPA system can recover 72 percent of the available braking energy in the Environmental Protection Agency (EPA) city cycle. The pump/motor operates for long periods at higher displacements and with a relatively high cycle average efficiency of 88 percent. With a return of 56 percent of the braking energy to the drive wheels (72 percent recovered in braking, and 88 percent transfer efficiency in both pumping and motoring), it is possible to recover 56 percent of the vehicle kinetic energy (or 75 percent of the velocity) while accelerating, neglecting road load friction. In the EPA city cycle it was possible to fill the hydraulic system when braking from 30 mph and then moderately accelerate again to about 22 mph using only stored energy from the HPA system.

A hydraulic or pneumatic pump/motor operates in a pumping mode and a motoring mode. When changing operating modes in a hybrid hydraulic vehicle between motoring and pumping, the inlet and outlet ports of the pump/motor must be switched between connections to high pressure and low pressure sources by changing the state of several valves in a hydraulic system. This switching creates a sudden release of energy, which can place a large shock loading on the system. The control method of this invention minimizes the large shock associated with this high speed pressure switching.

In the pumping mode, hydraulic fluid is moved from a low-pressure reservoir to a high-pressure accumulator. The pump outlet pressure rises as the pump rotates and very quickly opens a check valve to begin forcing fluid into the accumulator. In the motoring mode, high pressure fluid leaving the accumulator drives the pump/motor in rotation and returns to the reservoir.

While pumping or motoring, displacement of the pump/motor can be independently controlled to vary the volume of fluid moved during each revolution of the pump/motor rotor between its inlet and outlet ports. When switching from pumping to motoring, it is necessary to connect the accumulator to either the inlet port or the outlet port of the pump/motor, and to connect the reservoir to the other of the two ports.

High pressure solenoid valves accomplish this switching, which must be done carefully to prevent unsafe or unpleasant conditions for the vehicle occupants. For example, when switching from pumping to motoring, a valve opens to allow high pressure fluid to flow to the inlet port of the pump/motor. There is an immediate rise in pressure in the hydraulic line causing a noisy shock wave to propagate toward the pump/motor that may vibrate the components. In addition, if the pump/motor has a positive, non-zero displacement, the wheels of the vehicle will be driven by torque transmitted from the pump/motor causing the vehicle to move.

SUMMARY OF THE INVENTION

While pumping or motoring, displacement of the pump/motor can be independently controlled to vary the volume of fluid moved during each revolution of the pump/motor rotor between its inlet and outlet ports. When switching from pumping to motoring, it is necessary to connect the accumulator to either the inlet port or the outlet port of the pump/motor and to connect the reservoir to the other of the two ports.

High pressure solenoid valves accomplish this switching, which must be done carefully to prevent unsafe or unpleasant conditions for the driver or other vehicle occupants. For example, when switching from pumping to motoring, the valve opens to allow high pressure fluid to go to the inlet port of the pump/motor. There is an immediate rise in pressure in the hydraulic line causing a noisy shock wave to propagate toward the pump/motor that may vibrate the components. In addition, if the pump/motor has a positive, non-zero displacement, the wheels of the vehicle will be driven by torque transmitted from the pump/motor causing the vehicle suddenly, unexpectedly to move.

To prevent these problems, a proportional valve, whose output is applied to the swashplate of the pump/motor to establish the magnitude of pump/motor displacement, is controlled so that there is no displacement when switching between pumping and motoring. There is a hydraulic circuit leading from the accumulator to the inlet port. This hydraulic circuit has its own solenoid valve and more importantly has a restriction that limits flow. When a switch to motoring occurs, this low flow rate valve is opened first so that the pressure in the lines and on the inlet port rises relatively slowly. After the pressure has risen to a sufficient level, the valve in the main flow path is opened. If, after motoring for a predetermined period, the pressure in the accumulator is not sufficient to provide useful work, the pump/motor is put into a non-motoring mode to prevent cavitation, which is very noisy and can damage hydraulic components. The switching must occur before exhausting accumulator pressure to prevent noise and vibration from being transmitted to the occupants of the vehicle. In this case, the displacement control-proportional valve is ramped down to zero at a controlled rate before the mode control valves are switched.

A system according to this invention for transmitting power hydraulically to and from the wheels of a motor vehicle includes an accumulator containing fluid at relatively high pressure, a reservoir containing fluid at lower pressure, and a pump/motor driveably connected to the wheels and having an inlet, an outlet, and a variable volumetric displacement for pumping fluid between the accumulator and the reservoir. A first circuit connects the inlet to the reservoir and the outlet to the accumulator. A second circuit, which connects the inlet to the accumulator and the outlet to the reservoir, includes a first path having a low flow rate capacity and a second path having a higher flow rate capacity. A controller switches between pumping operation and motoring operation, opens and closes the first path during motoring operation, and reduces the displacement before switching between pumping operation and motoring operation. The first path includes a first valve responsive to the controller for opening and closing a connection between the accumulator and the inlet, and a first orifice arranged in series with the first valve having a relatively low flow rate capacity. The second path, arranged in parallel with the first path between the accumulator and the inlet, includes a second valve responsive to the controller for opening and closing a connection between the accumulator and the inlet, and a second orifice arranged in series with the second valve having a higher flow rate capacity than that of the first orifice.

The system switches operation of a hydraulic drive system for a vehicle between pumping and motoring by determining whether the pump/motor should enter pumping operation or motoring operation, alternately entering and exiting pumping operation and motoring operation, controlling the volumetric displacement during pumping operation and motoring operation, and decreasing the volumetric displacement to substantially zero displacement before exiting pumping operation and motoring operation.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
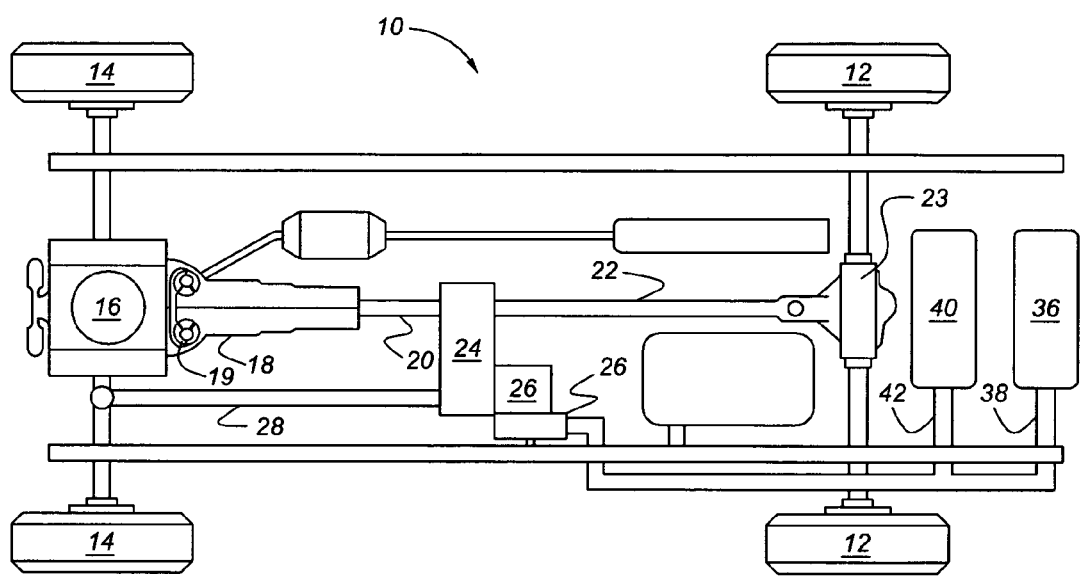
FIG. 1 is a schematic diagram of a powertrain for a hydraulic hybrid motor vehicle that operates in a brake regenerative mode and power assist mode.

Referring now to the drawings, there is illustrated in FIG. 1 a hydraulic hybrid powertrain 10 for driving the rear wheels 12 and front wheels 14 of a motor vehicle. A power source 16, such as an internal combustion engine, is driveably connected to a transmission 18, preferably an automatic transmission that produces multiple ratios of the speed of the engine and the speed of an output shaft 20. Suitable alternative transmissions include those that are manually operated, and those that produce continuously variable speed ratios or infinitely variable speed ratios, having chain drive, belt drive or traction drive mechanisms. The transmission output shaft 20 is continually driveably connected to the rear wheels 12 through a rear driveshaft 22, rear axle shafts, and a rear differential mechanism. A transfer case 24 selectively transfers a portion of the torque carried by output shaft 20 to a front driveshaft 28, which is driveably connected to the front wheels 14 through a front differential mechanism and front axle shafts. The vehicle, therefore, can operate in all-wheel drive or four-wheel drive modes.

A hydraulic pump/motor 26 having a variable volumetric displacement is continually driveably connected to the transmission output shaft 20 and to the rear driveshaft 22. When torque is transmitted in a positive torque directional sense, i.e., from the engine to the wheels, the engine 16 drives the pump/motor 26 through the transmission 18 and output shaft 20, and the rear wheels 12 through the driveshaft 22. When torque is transmitted in the negative torque direction, from the wheels to the engine, the rear wheels 12 drive the pump/motor 26 through rear driveshaft 22 and the transfer case 24. A dog clutch located in the transfer case 24 produces a releasable drive connection between the pump/motor 26 and the front driveshaft 28. A reservoir 36 containing hydraulic or pneumatic fluid at relative low pressure is connected through check valves and fluid lines 38 to the pump motor 26, as described with reference to FIG. 3. Similarly, an accumulator 40 containing hydraulic or pneumatic fluid at relative high pressure is connected through check valves and fluid lines 42 to the pump motor 26.

While accelerating the vehicle with hydraulic power assist, high pressure fluid in accumulator 40 drives the pump/motor 26, and the wheels 12, 14 are driven in rotation by the pump/motor, which operates then as a fluid motor. During operation in the brake regeneration mode, the vehicle is decelerated at least partially by recovering vehicle kinetic energy in the form of pressurized hydraulic fluid contained in accumulator 40. In the brake regeneration mode, the pump/motor 26 pumps fluid from reservoir 36 to the accumulator 40. The wheels 12 drive the pump/motor 26 through the rear axle and driveshaft 22, and the pump/motor 26 pumps fluid from reservoir 36 across a pressure differential between the pump inlet, which communicates with reservoir 36, and the pump outlet, which communicates with accumulator 40. Fluid entering the accumulator 40 compresses nitrogen contained in a bladder in the accumulator 40, and the accumulator is pressurized.

Figure 2:
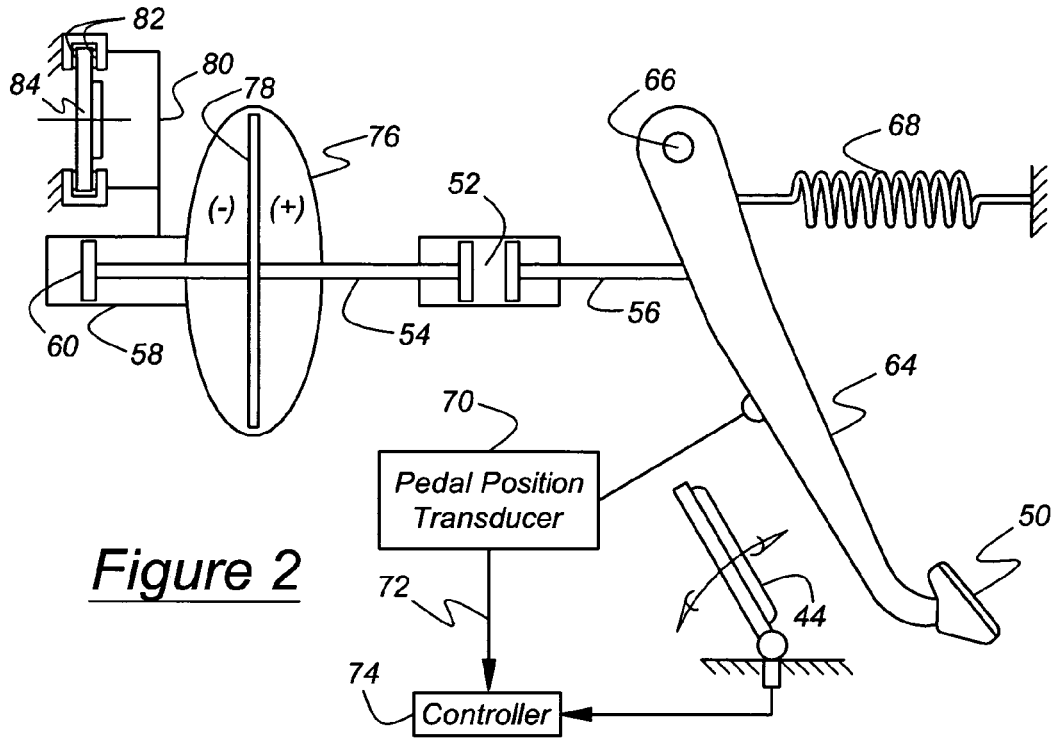
FIG. 2 is a schematic diagram of a brake pedal for use in controlling the brake regeneration mode of the powertrain of FIG. 1.

Referring now to FIG. 2, in a conventional vehicle when the foot brake pedal 50 is applied, the vehicle decelerates due to friction braking, i.e., frictional contact of brake pads or brake shoes on wheel brake rotors or drums. The kinetic energy of the vehicle is converted by this frictional contact to heat, which is dissipated. In a deadband parallel regenerative braking system, a space 52 is located between connecting rods 54, 56, which connect a brake master cylinder 58 and the foot brake pedal 50. The space 52 causes the brake pedal to move from the rest position shown in FIG. 2 through a first portion of its full displacement before hydraulic brake pressure is generated in the master cylinder due to movement of the piston 60 within the master cylinder 58. This delays the application of the wheel friction brakes as the pedal is being displaced. The range of brake pedal displacement in which no friction braking occurs, called the "deadband" region, is preferably about 30 percent of the full range brake pedal displacement beginning when the brake pedal is at rest and not displaced.

A tension spring 68, fastened to a brake lever 64 between the fulcrum 66 and the pedal 50, provides a force sensed by the vehicle operator and resisting brake pedal displacement in the deadband range. The force of spring 68, produced when depressing the brake pedal 50, compensates for the absence of a hydraulic pressure force opposing pedal displacement and piston movement in the master cylinder while the pedal is in the deadband range. A power brake canister 76 contains a piston 78, which is actuated by engine vacuum to increase the force applied to connecting rod 54 by depressing the brake pedal 50.

A brake pedal position transducer 70 produces an electronic signal 72 as input to controller 74 representing the position of the brake pedal 50. Controller 74 operates under control of a microprocessor, which executes programmed control logic for controlling the hydraulic system of FIG. 3 and the vehicle powertrain. The controller 74 receives input signals produced by other sensors representing fluid pressure at various places in the hydraulic system, volumetric displacement of the pump/motor, the magnitude of a variable swashplate angle that alters the displacement of the pump/motor, displacement of the accelerator pedal 44 and brake pedal 64, various inputs produced by the vehicle operator and powertrain system inputs. The controller 74 issues command signals, received by solenoid-operated hydraulic control valves of the hydraulic system causing the valves to produce various system operating states and transitions among those states.

Pressure in the hydraulic brake system 80, which actuates the friction brakes 82, changes as pressure in the master cylinder 58 changes due to displacement of piston 60 in the cylinder as the brake pedal 50 is depressed and released. When the brake pedal 50 is depressed beyond the deadband range sufficiently to close the space 52, brake system pressure forces the brake pads 82 into frictional contact with the brake disc 84, to which a wheel 12 is fixed.

In addition to the friction brakes, the vehicle is braked also by a regenerative brake system. While the brake pedal 50 is depressed, the operating states of hydraulic pump/motor 26 are changed between a pump state and motor state in response to command signals produced by controller 74.

Figure 3:
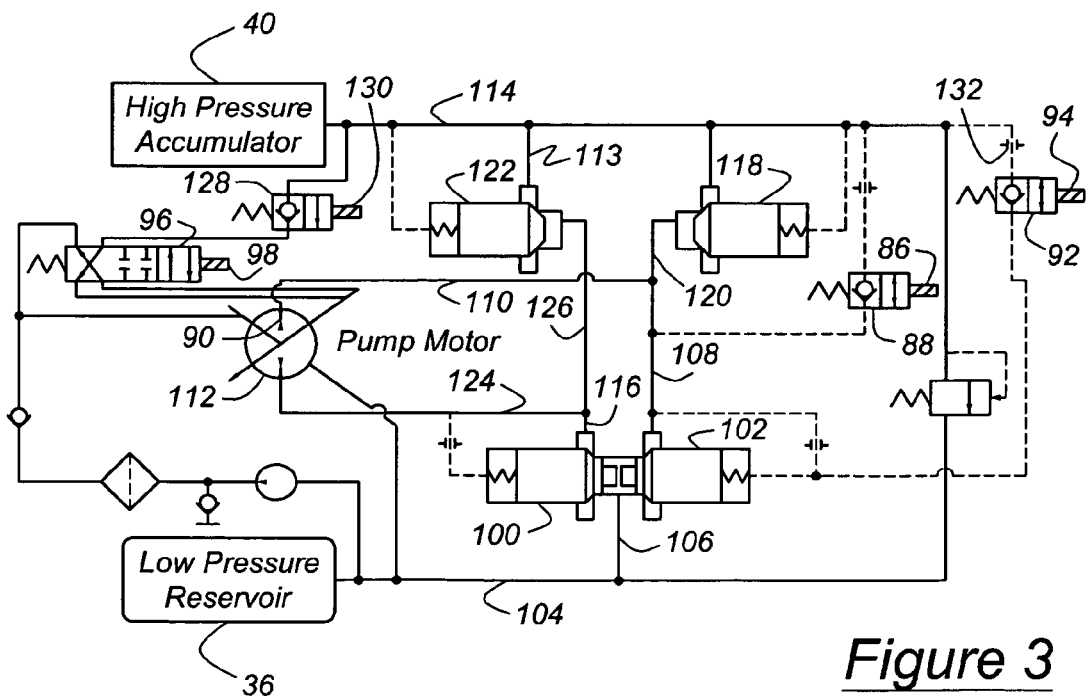
FIG. 3 is a schematic diagram of a hydraulic system for the vehicle showing the pump/motor, accumulator, reservoir, control valves and hydraulic lines connecting them.

The mode valve 88 is switched between the closed state shown in FIG. 3 and an open state by a solenoid 86 in response to command signals from controller 74. A low flow rate valve 92 is switched between the closed state shown in FIG. 3 and an open state by a solenoid 94 in response to command signals produced by controller 74.

Preferably the pump/motor 26 is a bent-axis variable displacement unit whose maximum displacement is 150 cc per revolution, and available commercially from Ifield Technology, Inc. At peak pressure of about 5000 psi., the pump/motor produces approximately 600 ft-lb of braking torque in the pumping mode or acceleration torque in the motoring mode to the driveshaft 22. Displacement of the pump/motor is varied by changing the angular disposition of a swashplate. System fluid in a pressure range 2500–5000 psi. controls the swashplate angle. A PID control system continually produces a command signal tending to minimize the difference between the current swashplate angle and the angle corresponding to the desired magnitude of torque produced by the pump/motor 26.

A four-way swashplate control valve 96, also called a proportional valve, changes the variable displacement of the pump/motor 26 in response to commands issued by controller 74. Solenoid 98 changes the state of valve 96 among three states, a center position where the inlet and outlet of valve 96 are mutually disconnected, a left-hand position where the angular disposition of the swashplate and displacement of the pump/motor 26 decrease, and a right-hand position where the swashplate angle and displacement of the pump/motor 26 increase. Proportional valve 96 is switched between its states by a solenoid 98 in response to command signals from controller 74.

Poppet valves 100, 102 move rightward from the position of FIG. 3 to open a hydraulic connection between reservoir 36 and the inlet 90 of the pump/motor 26 through lines 104, 106, 108, 110. Poppet valves 100, 102 move leftward from the position of FIG. 3 to open a hydraulic connection between the outlet 112 of the pump/motor 26 and reservoir 36 through lines 124, 116, 106, 104. Poppet valve 118 moves rightward from the position of FIG. 3 to open a hydraulic connection between accumulator 40 and the inlet 90 of the pump/motor 26 through lines 114, 120 and 110. Poppet valve 122 moves leftward from the position of FIG. 3 to open a hydraulic connection between outlet 112 of the pump/motor 26 and accumulator 40 through lines 124, 126, 113 and 114. Poppet valves 118 and 122 are closed in the positions shown in FIG. 3

An isolation valve 128, controlled by solenoid 130 in response to command signals from controller 74, alternately opens and closes a connection between accumulator 40 and an inlet of valve 96.

In operation, to place the hydraulic system in the pumping operation mode, isolation valve 128 opens a connection from accumulator 40 to the proportional valve 96, which is moved to the right-hand state, where variable force solenoid 98 is prepared to increase displacement of the pump/motor 26 by increasing the swashplate angle. Poppet check valves 100, 102 are moved rightward to connect reservoir 36 to the inlet port 90 of the pump/motor 26 through hydraulic lines 104, 106, 108 and 110. Check valve 118 closes line 120 from the accumulator 40, but check valve 122 opens line 126 to the accumulator 40 through line 114 when pump/motor 26 is turning and pressure at the pump outlet 112 exceeds the pressure in the accumulator 40. These steps complete a hydraulic circuit from the reservoir 36 to and through the pump/motor 26, and from pump/motor to the accumulator 40. Preferably the control signal applied to solenoid 98 is an electric current in the range 0–2 amps. The swashplate angle and displacement of the pump/motor 26 changes in proportion to the magnitude of the current signal at solenoid 98.

Pump displacement is directly related to the torque necessary to rotate the pump rotor at a given hydraulic pressure. When the brake pedal 50 is in the deadband range, the system operates in the pump mode, and vehicle braking is entirely accomplished by the pump 26. If the brake pedal is displaced past the deadband range, vehicle braking is accomplished by a combination by regenerative braking and friction braking in the correct proportion to achieve the vehicle deceleration rate desired by the vehicle operator.

Before switching the hydraulic system from pumping operation mode to the motoring mode, the proportional valve 96 first causes the pump/motor displacement to be zero so that cavitation of the pump/motor is prevented during the transition. Proportional control is also prevented, i.e., if the controller determines that a positive swash angle is desired in order to meet powertrain system requirements, the controller nonetheless maintains pump/motor displacement at zero until the transition of the system to the motoring mode is completed. Isolation valve 128 is closed upon a command from controller 74 to its actuating solenoid 130. Then the low flow rate valve 92 is opened, which forces poppet check valves 100, 102 leftward, thereby closing line 106 from line 108, and opening line 116 to reservoir 36 through lines 104 and 106. This opens a hydraulic connection between reservoir 36 and the pump/motor outlet 112. With the hydraulic system so disposed, the accumulator is connected through line 114, restriction orifice 132, valve 92 and lines 108, 110 to the inlet 90. The low flow rate valve 92 is opened for a period of about 200 ms until the system is pressurized sufficiently by accumulator 40. Controller 74 includes a countdown timer, which expires in about 200 ms. after the transition to pumping mode begins.

Then when the timer expires, the low flow rate valve 92 closes and the mode valve 88 opens to the accumulator pressure, which moves poppet check valve 118 rightward, thereby opening a high flow rate connection between accumulator 40 and the pump/motor inlet 90 through line 114, valve 118, and lines 120, 110. These steps complete the transition to the motoring mode. Thereafter, controller 74 permits proportional control, and the pump/motor displacement follows input from the accelerator pedal representing desired wheel torque increases and decreases.

Figure 4:
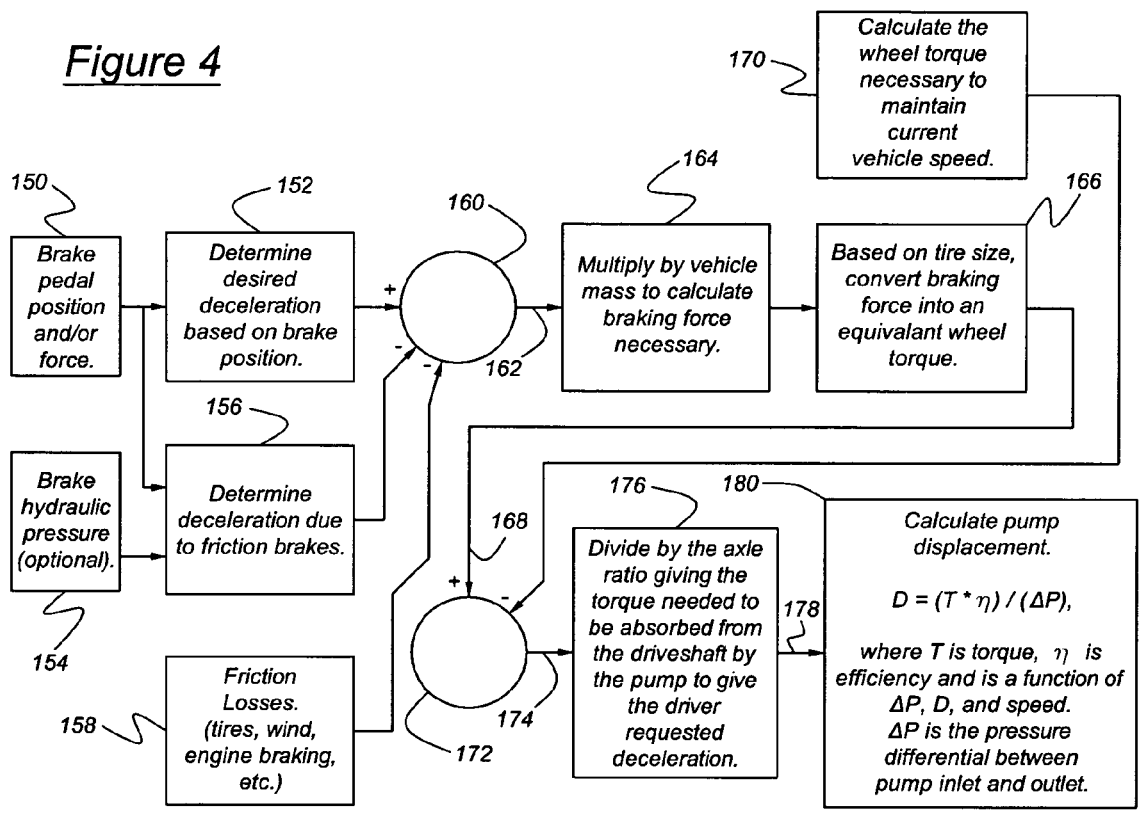
FIG. 4 is diagram of logic for controlling brake regeneration in a deadband range of brake pedal position.

Referring now to FIG. 4, after the vehicle operator depresses the brake pedal, the extent to which the brake pedal is depressed 150, called "brake pedal position," is used to determine the current desired vehicle deceleration rate 152. Brake system hydraulic pressure 154 at the wheel brakes is used with the brake pedal position 150 to determine the corresponding vehicle deceleration rate due to applying the friction brakes 156. Parasitic drag on the vehicle 158 due to tire friction and air friction, and the effects of engine braking are used to determine vehicle deceleration due to these factors. The vehicle deceleration rates 152, 156, 158 are added algebraically at summing junction 160 to produce a net vehicle deceleration rate 162.

At 164, the vehicle mass is multiplied by the net vehicle deceleration rate 162 to produce the magnitude of force, which if applied to the vehicle, would produce the net vehicle deceleration rate 162.

That force is converted at 166 to an equivalent wheel torque 168 using the tire size and a nominal coefficient of friction between the tires and the road surface. At 170, the wheel torque required to maintain the current vehicle speed is calculated. At summing junction 172, the magnitude of the difference between torques 168 and 170 is calculated to determine the change in wheel torque 174 necessary to stop the vehicle from the current speed at the desired deceleration rate 152.

At 176, that differential torque 174 is divided by the axle ratio to determine the magnitude of torque 178 that must be deducted from the torque transmitted by the driveshaft 28 to the pump/motor 26 in order to produce the desired vehicle deceleration rate 152. Then at 180, the pump displacement corresponding to torque 178 is calculated. The controller 74 produces a command signal that is transmitted to solenoid 98 of the a proportional valve 96 in order to change the angular position of the swashplate and to change the displacement of the pump/motor 26 to the pump displacement calculated at 180.

The brake hold control uses the hydraulic drive system for braking a stopped vehicle against creeping while automatic transmission 18 is in gear despite there being little or no vehicle kinetic energy to recover by regenerative braking. The brake hold control determines whether (1) the transmission 18 is in gear, i.e., whether a gear selector controlled by the vehicle operator is a drive range, (2) the brake pedal 50 is depressed, and (3) the vehicle is stopped or has a speed that is equal to or less than a low reference speed. The position of the gear selector is controlled by the vehicle operation by moving a selector among forward drive, park, neutral and reverse drive ranges, called PRNDL positions.

If these conditions are true, and provided an accelerator pedal 44 is not depressed, the brake hold control is activated. Mode valve 88 is placed in the pump position by solenoid 86 in response to a control signal from controller 74. Isolation valve 128 is energized by solenoid 130, thereby connecting the accumulator 40 to the inlet of swashplate control valve 96, so that displacement of the pump motor 26 can be increased, preferably linearly, to its maximum displacement, through operation of solenoid 98 in response to commands from controller 74. Displacement of the pump/motor 26 is increased such that the magnitude of negative torque transmitted to the wheels 12 by the pump/motor 26 is greater than the magnitude of positive torque transmitted from the engine through the transmission 18 and its torque converter to the wheels 12. In this way the vehicle wheels 12 are braked sufficiently so that the vehicle will not creep due to the effect of the idling engine transmitting torque to the wheels through the torque converter of the automatic transmission. This control requires minimal brake pedal effort to keep the vehicle stopped in an idling condition.

Controller 74 determines the magnitude of torque produced by the engine on the basis of engine speed, engine throttle position, mass air flow and other pertinent engine parameters. The transmission gear ratio and axle ratio are then used to determine by calculation the torque transmitted to the wheels by the idling engine. That torque is comparable to the torque 170 of FIG. 4. The displacement of the pump/motor 26 that will produce enough negative torque at the wheels to react to the idle torque is determined as described with reference to step 178. Then the controller produces a command signal that is transmitted to solenoid 98 for the proportional valve 96 to change the angular position of the swashplate and the displacement of the pump/motor 26 to a displacement slightly greater than the pump displacement calculated at 178.

Figure 5A:
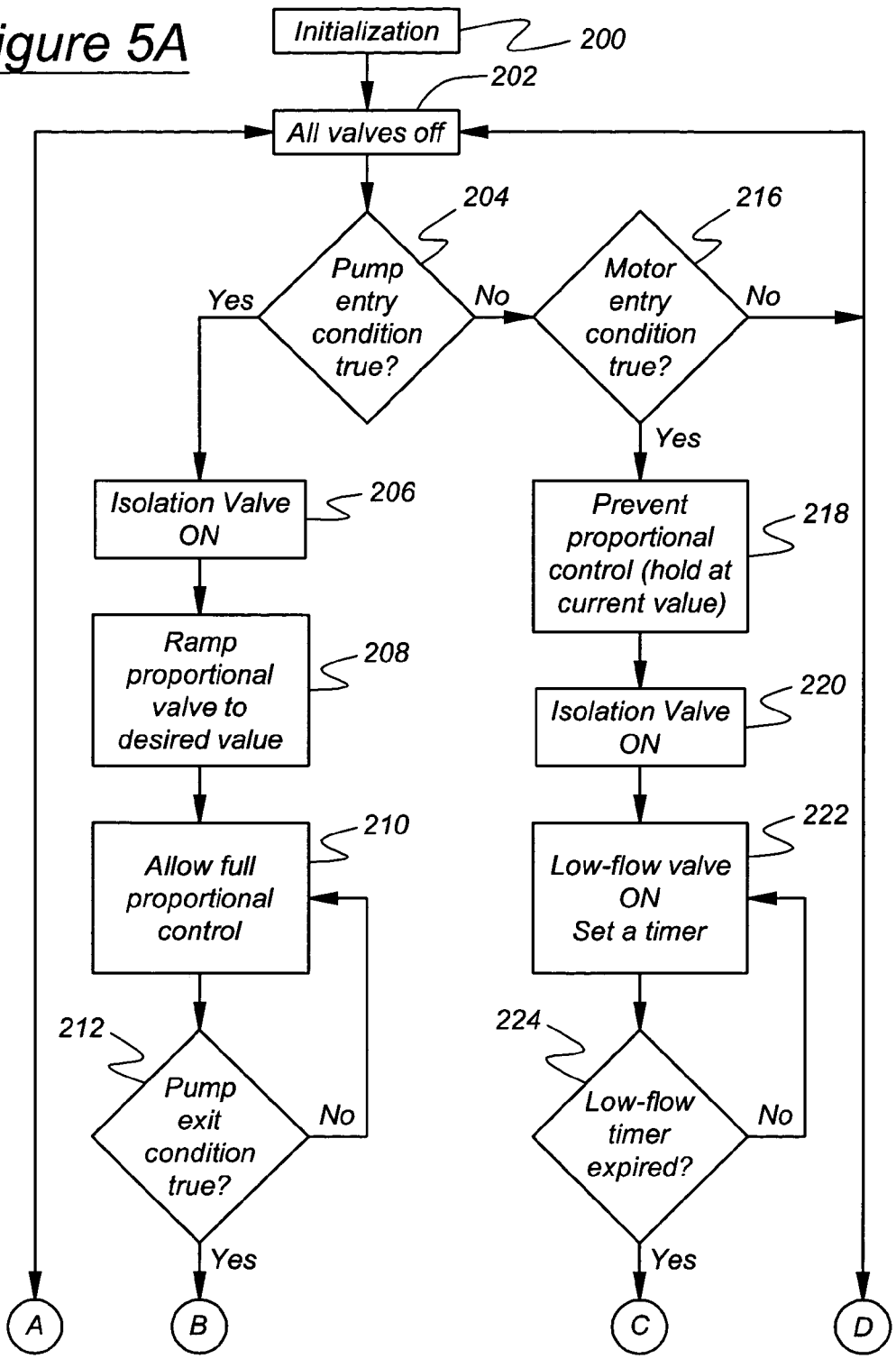
FIG. 5 is a logic diagram for controlling the hydraulic system of FIG. 3.
Figure 5B:
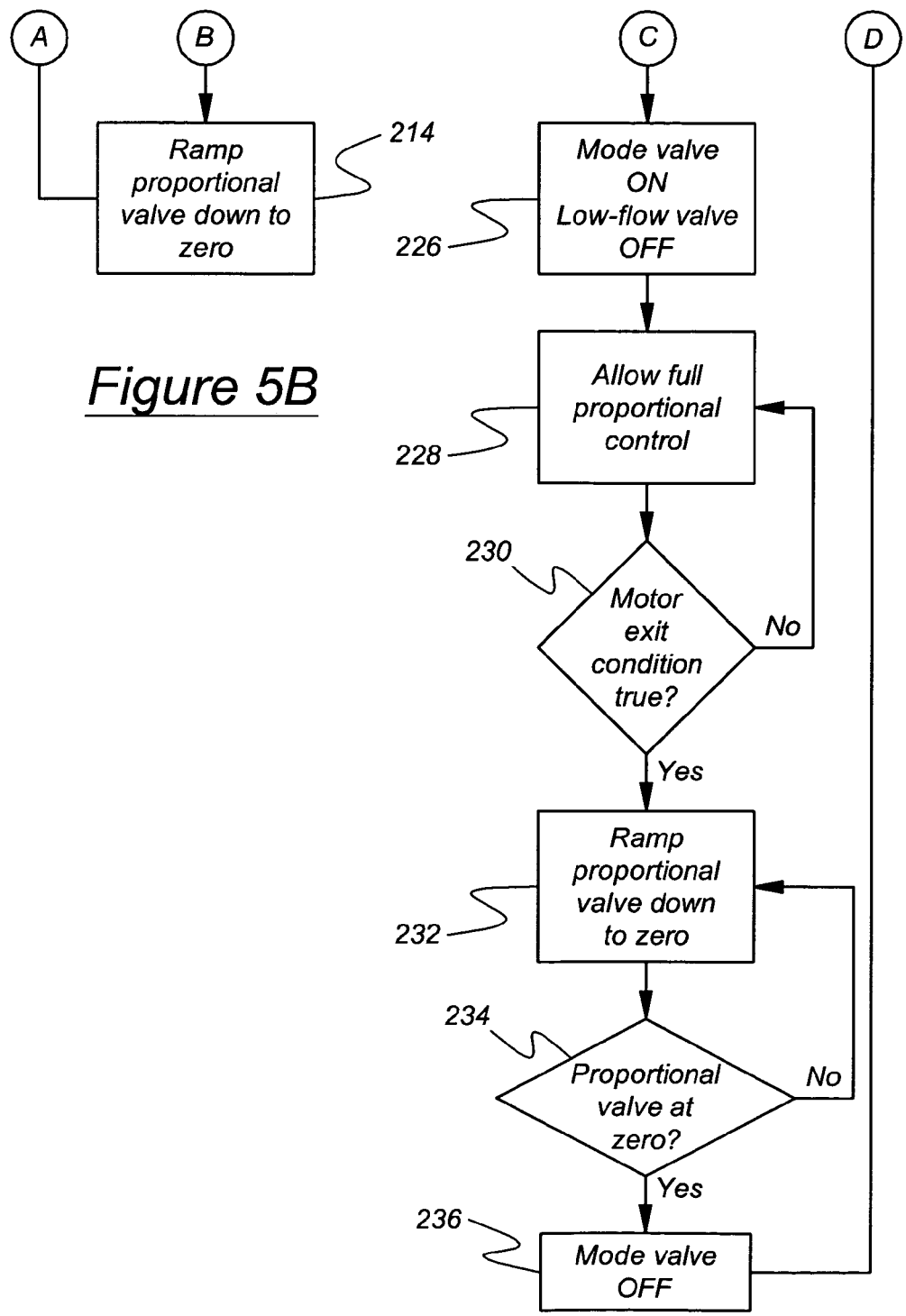

Referring to FIG. 5, after being initialized at 200, the control executed by controller 74 first checks at 202 whether the poppet, flow, mode, isolation and proportional valves are closed. Then at 204 a check is made to determine whether the pump mode entry conditions are met. The pump mode is entered if the controller determines a need for increased torque, vehicle speed is less than about 30–40 mph, pressure in accumulator is less than a predetermined magnitude, and other similar powertrain system conditions. If those conditions are logically true, at 206 isolation valve 128 is placed in its ON state by the controller 74 issuing a command signal to its actuating solenoid 130. The proportional valve 96 is ramped to its desired displacement magnitude by changing the magnitude of current supplied to solenoid 98 at step 208 and full proportional control is initiated at 210. When the pump mode exit conditions are present, at 212 the proportional valve 96 is ramped down to produce zero pump/motor displacement and torque at 214. The pumping mode exit conditions are essentially the opposite of the corresponding entry conditions.

If the pump entry conditions are logically false, a check is made at 216 to determine whether the motor entry conditions are logically true. If so, proportional control is prevented at 218, the isolation valve 128 is placed in its ON state at 220 by issuing a command signal to its actuating solenoid 130, the low flow valve 92 is placed in its ON state at 222, and low flow timer is set. The motoring mode entry conditions include a powertrain condition for which torque produced by the pump/motor is desired to drive the vehicle wheels, the presence of a sufficient magnitude of fluid pressure and volume in the accumulator, vehicle speed in a range 0–30 mph, and additional powertrain system conditions. A check is made at 224 to determine whether the low flow timer has expired. If so, at 226, the mode valve 88 is placed in its ON state, and low flow valve 92 is turned OFF. Next at 228, full proportional control is enabled. A check is made at 230 to determine whether the motor exit conditions are logically true. If so, at 232 the proportional valve 96 begins to ramp motor displacement and torque output by the pump/motor 26 down to zero. When the proportional valve has completed the linear decrease of pump/motor displacement to zero, as indicated by a positive test at 234, at 236 the mode valve 88 is closed at 236.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A powertrain system for transmitting power hydraulically to and from the wheels of a motor vehicle, comprising:

an accumulator containing fluid at relatively high pressure;
a reservoir containing fluid at lower pressure;
a pump/motor driveably connected to the wheels, having a variable volumetric displacement for pumping fluid between the accumulator and the reservoir, including an inlet and an outlet;
a first circuit connecting the inlet to the reservoir and connecting the outlet to the accumulator;
a second circuit connecting the inlet to the accumulator and connecting the outlet to the reservoir, including a first path having a low flow rate capacity, a second path having a higher flow rate capacity than that of the first path; and
a controller for switching between pumping operation and motoring operation, opening and closing the first path during motoring operation, and reducing said displacement before switching between pumping operation and motoring operation.

2. The system of claim 1, further comprising:
an engine driveably connected to the wheels and the pump/motor, for driving the pump/motor to pump fluid from the reservoir to the accumulator during pumping operation.

3. The system of claim 1, wherein the first circuit further comprises a first check valve for opening a connection between the accumulator and the outlet at a first predetermined pressure differential across the first check valve, and closes said connection at a pressure differential across the first check valve that is less than said first pressure differential.

4. The system of claim 1, wherein:
the first path includes a first valve responsive to the controller for opening and closing a connection between the accumulator and the inlet, and a first orifice arranged in series with the first valve having a relatively low flow rate capacity; and
the second path is arranged in parallel with the first path between the accumulator and the inlet, includes a second valve responsive to the controller for opening and closing a connection between the accumulator and the inlet, and a second orifice arranged in series with the second valve having a higher flow rate capacity than that of the first orifice.

5. The system of claim 1, wherein:
the first path includes a first valve responsive to the controller for opening and closing a connection between the accumulator and the inlet, and a first orifice arranged in series with the first valve having a relatively low flow rate capacity;
the second path is arranged in parallel with the first path between the accumulator and the inlet, includes a second valve responsive to the controller for opening and closing a connection between the accumulator and the inlet, and a second orifice arranged in series with the second valve having a higher flow rate capacity than that of the first orifice; and
a third path arranged mutually parallel with the first and second paths, including a second check valve that opens a connection between the accumulator and the inlet at a predetermined pressure differential across the second check valve, and closes said connection at a pressure differential across the second check valve that is less than the second pressure differential.

6. The system of claim 1, further comprising:
a proportional valve responsive to the controller, communicating with the accumulator and having a first state in which said displacement is increased, and a second state in which said displacement is decreased.

7. The system of claim 1, further comprising:
a proportional valve responsive to the controller, communicating with the accumulator and having a first state in which said displacement is increased, and a second state in which said displacement is decreased; and
an isolation valve responsive to the controller for opening and closing a connection between the accumulator and the proportional valve.

8. The system of claim 1, wherein the first circuit further comprises:
a third check valve for opening a connection between the reservoir and the inlet for pumping operation, and for closing said connection for motoring operation.

9. The system of claim 1, wherein the second circuit further comprises:
the fourth check valve for opening a connection between the reservoir and the outlet for motoring operation, and for closing said connection for pumping operation.

10. The system of claim 1, wherein the controller includes a countdown timer having a predetermined period that begins upon opening the first path, and the controller further closing the first path upon expiration of the predetermined period.

11. The system of claim 1, wherein the controller further controls said displacement during pumping operation and motoring operation.

12. A method for switching operation of a hydraulic drive system between pumping and motoring in a vehicle that includes wheels driveably connected to a pump/motor having an inlet, an outlet and a variable volumetric displacement for pumping fluid between a high pressure accumulator and a low pressure reservoir, the method comprising the steps of:
determining from current conditions whether the pump/motor should enter pumping operation or motoring operation;
alternately entering and exiting pumping operation and motoring operation;
increasing and varying said volumetric displacement during pumping operation and motoring operation;
decreasing said volumetric displacement to substantially zero displacement before exiting pumping operation or motoring operation; and
providing a circuit connecting the inlet to the accumulator and connecting the outlet to the reservoir, including a first path having a low flow rate capacity, a second path having a higher flow rate capacity than that of the first path; and
opening and closing the first path during motoring operation.

13. The method of claim 12, further comprising:
providing a first circuit connecting the inlet to the reservoir and connecting the outlet to the accumulator.

14. The method of claim 12, further comprising:
providing a first circuit connecting the inlet to the reservoir and connecting the outlet to the accumulator;
providing a second circuit connecting the inlet to the accumulator and connecting the outlet to the reservoir, including a first path having a low flow rate capacity, a second path having a higher flow rate capacity than that of the first path;
opening and closing the first path during motoring operation;
starting a countdown timer having a predetermined period upon opening the first path; and
closing the first path upon expiration of the predetermined period.

* * * * *